United States Patent [19]
Sonobe

[11] Patent Number: 5,958,025
[45] Date of Patent: Sep. 28, 1999

[54] DIRECT MEMORY ACCESS (DMA) VIA SEPARATE BUS UTILIZING A BUFFER FOR CONNECTING THE BUS TO THE MEMORY DURING DMA MODE AND DISCONNECTING IT OTHERWISE

[75] Inventor: Satoru Sonobe, Tokyo, Japan

[73] Assignee: NEC Corporation, Tokyo, Japan

[21] Appl. No.: 08/883,312

[22] Filed: Jun. 26, 1997

[30] Foreign Application Priority Data

Jun. 28, 1996 [JP] Japan ..................................... 8-188286

[51] Int. Cl.$^6$ ....................................................... G06F 13/14
[52] U.S. Cl. ............................................... 710/27; 710/28
[58] Field of Search .............................. 395/847; 710/22, 710/27, 28

[56] References Cited

U.S. PATENT DOCUMENTS

| | | | |
|---|---|---|---|
| 4,122,520 | 10/1978 | Adamchick et al. ..................... | 364/200 |
| 4,665,483 | 5/1987 | Ciacci et al. ............................ | 364/200 |
| 4,935,868 | 6/1990 | Dulac ...................................... | 364/200 |
| 4,975,832 | 12/1990 | Saito et al. .............................. | 364/200 |
| 5,546,568 | 8/1996 | Bland et al. ............................ | 395/550 |
| 5,692,201 | 11/1997 | Yato ....................................... | 395/750 |

FOREIGN PATENT DOCUMENTS 2-244312    9/1990    Japan .

Primary Examiner—Thomas C. Lee
Assistant Examiner—Abdelmonieml Elamin
Attorney, Agent, or Firm—McGinn & Gibb, P.c.

[57] ABSTRACT

To increase access speed, a single-chip computer system having a direct memory access (DMA) mode, includes a central processing unit (CPU) for executing instructions, a first bus connected to the CPU, a memory array connected to the first bus, for storing data, a buffer connected to the first bus, a second bus connected to the buffer, and a communication circuit, connected to the second bus, for receiving and outputting data. The buffer connects the first bus to the second bus when the DMA mode is executed, and disconnects the first bus from the second bus when the DMA mode is not executed.

26 Claims, 7 Drawing Sheets

DIRECT MEMORY ACCESS (DMA) VIA SEPARATE BUS UTILIZING A BUFFER FOR CONNECTING THE BUS TO THE MEMORY DURING DMA MODE AND DISCONNECTING IT OTHERWISE

BACKGROUND OF THE INVENTION

The present invention generally relates to a computer system, and more particularly to a computer system having a direct memory access (DMA) mode.

Description of the Related Art Currently, to minimize power consumption, a DMA mode is used by a computer system. When the DMA mode is operating, a central processing unit (CPU) of the computer system is idle during transmission of data (e.g., sending data or receiving data).

FIG. 1 illustrates a conventional computer system disclosed in Japanese Patent Application Laid-Open No. 2-244312. A central processing unit (CPU) 101 is connected to a memory 102, and a plurality of peripheral circuits (e.g., a CPU clock control circuit 103, an interrupt control circuit 104, a DMA circuit 106, and a serial communication circuit 107) by a bus 111.

The CPU clock control circuit 103 controls a quartz oscillator 112, and outputs clock signals generated by the quartz oscillator 112 to the CPU 101 using a line k. In the DMA mode, the CPU clock control circuit 103 terminates an operation of the quartz oscillator 112, and therefore, the CPU 101 cannot process any instructions. During this time, the CPU does not consume electric power (e.g., current, voltage), and thus system power consumption is minimized.

When the DMA mode is finished, the CPU clock control circuit 103 starts the quartz oscillator 112 for generating clock signals. After obtaining a stable frequency for the clock signals (e.g., after a predetermined time), the CPU clock control circuit 103 supplies the clock signals to the CPU.

Thus, the DMA mode is accomplished. For brevity, a detailed explanation is not provided herein, because such is disclosed in the Japanese Patent Application Laid-Open No. 2-244312.

However, the CPU 101 of the conventional computer system cannot access readily and efficiently the memory 102, even if a high performance CPU (e.g., a reduced instruction set computer (RISC)—type CPU) is used as the CPU 101. Specifically, the CPU 101 and the memory 102 are connected together by the bus 111 connected commonly to the peripheral circuits. The bus 111 includes load capacities such as wiring capacities and input capacities from the peripheral circuits, thereby reducing the CPU's access speed to the memory.

Additionally, the bus 111 multiplexes addresses and data to reduce the wiring area on a semiconductor chip including the conventional computer system. Therefore, the CPU 101 requires several clocks (e.g., clock periods) to access the memory 102 due to the multiplexing operation.

Further, there is a delay time from finishing the DMA mode to generating a stable frequency for the clock signals because the quartz oscillator 112 is inoperable during the DMA mode. Normally, several milli-seconds are required to stabilize the oscillations of a quartz oscillator after it is started from an idle state.

As a result, the memory system cannot operate and process instructions with high-speed, especially after the quartz oscillator has been idle. This is a problem.

SUMMARY OF THE INVENTION

In view of the foregoing and other problems of the conventional structure, it is therefore an object of the present invention to provide an improved computer system having a DMA mode.

It is another object of the present invention to provide an improved clock control circuit for the DMA mode.

In a first aspect, a computer system having a direct memory access (DMA) mode, according to the present invention, includes a central processing unit (CPU) for executing instructions, a first bus connected to the CPU, a memory array connected to the first bus, for storing data, a buffer connected to the first bus, a second bus connected to the buffer, and a communication circuit connected to the second bus, for receiving and outputting data, wherein the buffer connects the first bus to the second bus when the DMA mode is executed, and disconnects the first bus to the second bus when the DMA mode is not executed.

With the unique and unobvious structure of the present invention, the buffer connects the first bus to the second bus when the DMA mode is executed, and disconnects the first bus to the second bus when the DMA mode is not executed. Therefore, access speed becomes faster when the DMA mode is not executed, because a total length of the buses used by the CPU becomes substantially shorter when the DMA mode is not executed. Further, a single oscillator is provided which oscillates regardless of the computer system being in the DMA mode or not. Thus, a stable oscillating frequency is produced continually, and there is no "wait time" required for the oscillations to become stable, as in the conventional system.

BRIEF DESCRIPTION OF THE DRAWINGS

The foregoing and other objects, aspects and advantages will be better understood from the following detailed description of preferred embodiments of the invention with reference to the drawings, in which:

FIG. 3 is a timing-chart for explaining the operation for receiving serial data of the system shown in. FIG. 2;

DETAILED DESCRIPTION OF PREFERRED EMBODIMENTS OF THE INVENTION

Figure 1:
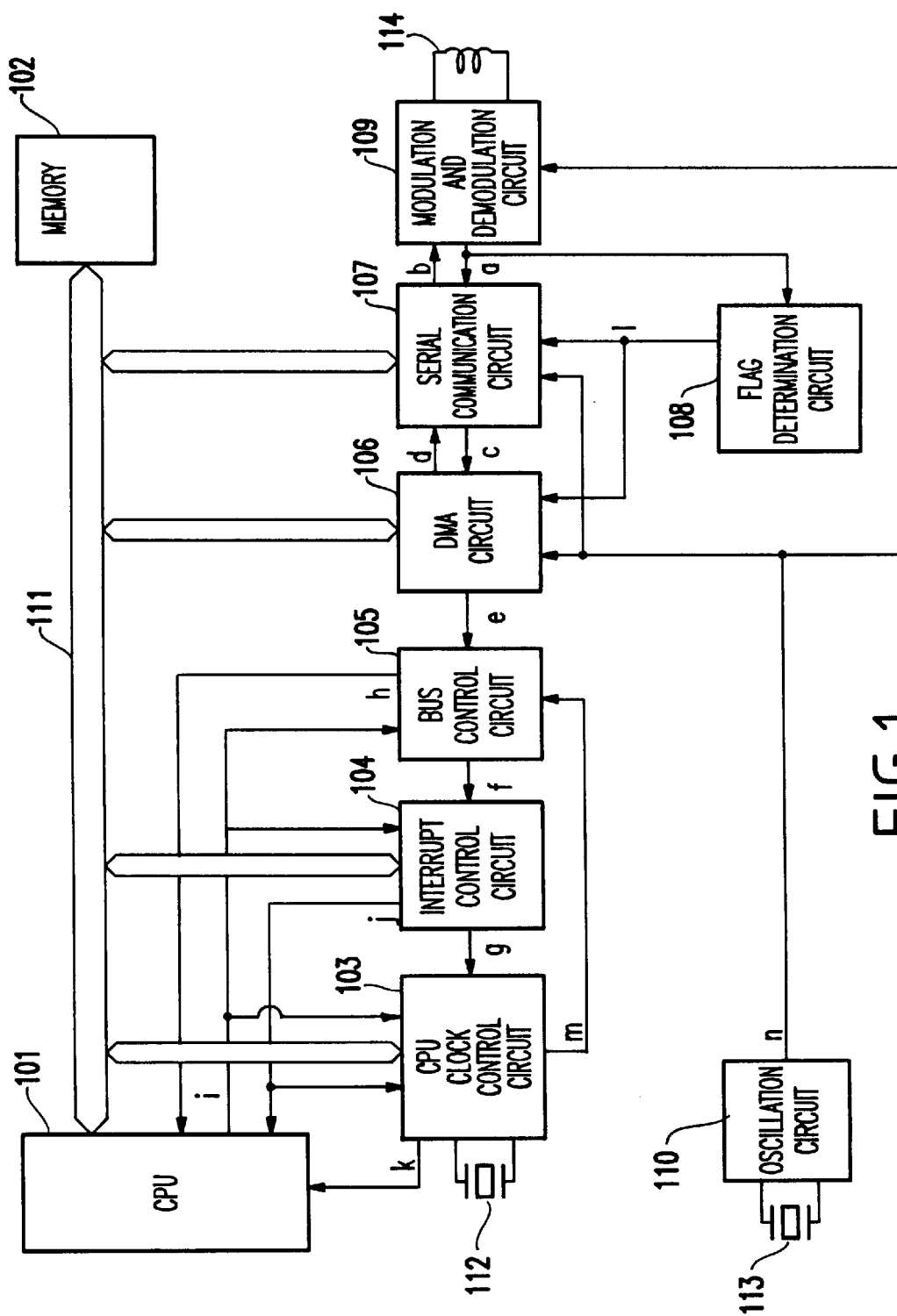
FIG. 1 illustrates a conventional computer system having a DMA mode.

Referring now to the drawings, and more particularly to FIGS. 2–6, a computer system is shown according to a first embodiment of the present invention.

Figure 2:
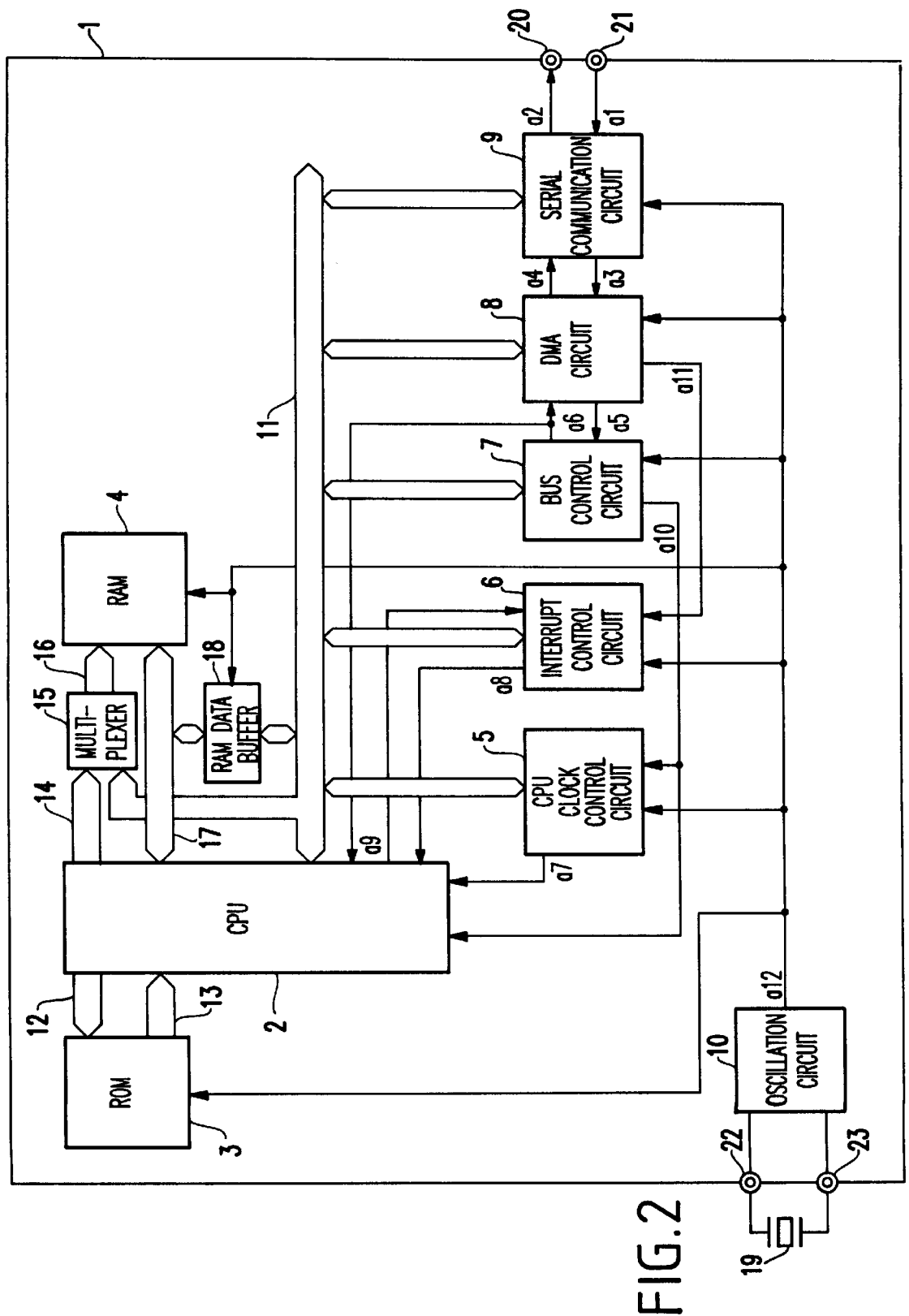
FIG. 2 illustrates a computer system having a DMA mode according to a first embodiment of the present invention.

FIG. 2 is a block diagram illustrating a single-chip computer system which includes a CPU 2, a read-only memory (ROM) 3 for storing instructions executed by the CPU 2, a random access memory (RAM) 4 for storing data, a CPU clock control circuit 5, an interrupt control circuit 6, a bus control circuit 7, a DMA circuit 8 for performing a DMA operation with a peripheral attached thereto, a serial communication circuit 9 for receiving and outputting serial data, an oscillation circuit 10, an internal bus 11 for connecting the CPU 2, the serial communication circuit 9, the DMA circuit 8, the bus control circuit 7, the interrupt control circuit 6, and the clock control circuit 5 commonly, a ROM address bus 12 through which the CPU 2 outputs an address to the ROM 3, a ROM data bus 13 through which the ROM 3 outputs data to the CPU 2, a RAM address bus 14 through which the CPU 2 outputs addresses AUTO to the RAM 4, a multiplexer 15 for selecting between the internal bus 11 and a RAM address bus 14, a RAM data bus 17, a RAM data buffer 18 for connecting the RAM data bus 17 and the internal bus 11, and a quartz oscillator 19. FIGS. 3–6 are timing-charts and flow-charts for describing a sequential process of the system shown in FIG. 2.

In the single-chip computer system 1, a serial input a1 from a serial input terminal 21 and a serial output a2 to an output terminal 20 are connected to the serial communication circuit 9. A serial transmission (e.g., outputting data) / reception (e.g., receiving data) completion signal a3 of the serial communication circuit 9 is outputted to the DMA circuit 8. A data strobe signal a4 of the DMA circuit 8 is outputted to the serial communication circuit 9. A DMA request signal a5 is outputted to the bus control circuit 7, and a DMA interrupt signal a11 is outputted to the interrupt control circuit 6.

A DMA acknowledge signal a6 of the bus control circuit 7 is outputted to the CPU 2 and the DMA circuit 8. A CPU clock stop signal a10 is outputted to the CPU 2 and the CPU clock control circuit 5. An interrupt request signal a8 of the interrupt control circuit 6 is outputted to the CPU 2. A clock signal a7 of the CPU clock oscillation control circuit 5 is outputted to the CPU 2. An interrupt acknowledge signal a9 is outputted to the interrupt control circuit 6 from the CPU 2.

A quartz oscillator 19 is connected to the oscillation circuit 10 by terminals 22 and 23. A system clock a12 is outputted from the oscillation circuit 10 to the ROM 3, the RAM 4, the RAM data buffer 18, the CPU clock control circuit 5, the interrupt control circuit 6, the bus control circuit 7, the DMA circuit 8, and the serial communication circuit 9.

The CPU clock control circuit 5 receives the system clock a12, generates clock signals for the CPU 2 by using the system clock a12, and outputs the clock signals for the CPU 2 as a signal a7. The CPU clock control circuit 5 has no quartz oscillators, and simply divides (or multiplies) the frequency of the system clock a12 to generate the clock signals for the CPU 2.

The first embodiment of the present invention further differs from the conventional system in that the CPU 2 and the RAM 4 are connected together by the RAM data bus 17 (e.g., a bus dedicated for RAM data) which is different from the internal bus 11, and that the RAM data bus 17 and the internal bus 11 are connected together by the RAM data buffer 18. Additionally, the address bus 14 to which the CPU 2 outputs an address for accessing the RAM 4 and the internal bus 11 are switched selectively by the multiplexer 15. Therefore, one of the RAM 4 and the internal bus 11 can be connected to the address bus 16. Further, the quartz oscillator 19 continues to operate during the DMA mode. Thus, oscillator 19 is not switched off (e.g., terminated), and continually outputs oscillating signals having a stable frequency.

A reception operation (e.g., receiving data) of this embodiment is described with reference to the timing chart in FIG. 3 and the flowchart in FIG. 4.

Figure 4:
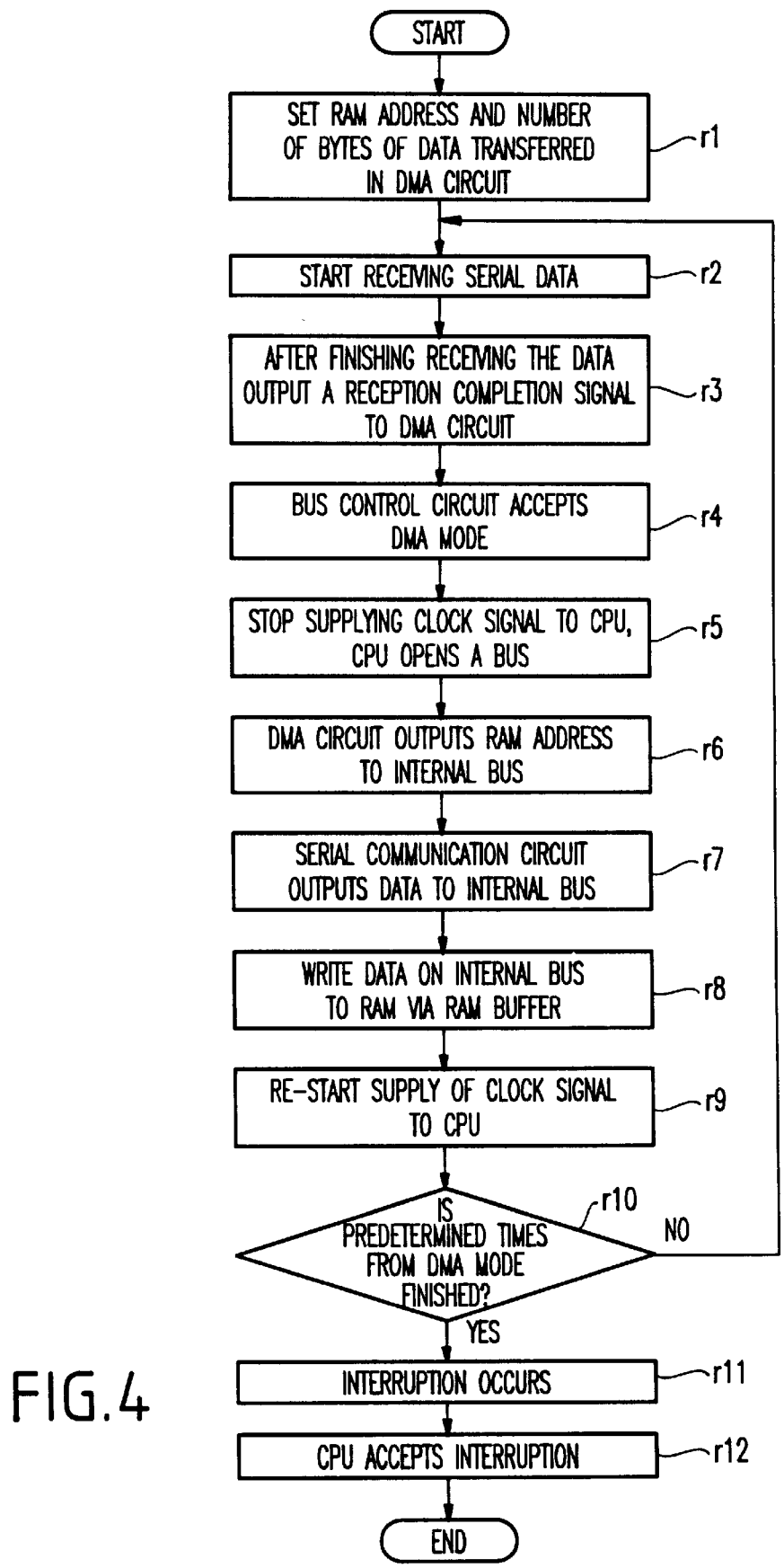
FIG. 4 is a flowchart for explaining the operation for receiving serial data of the system shown in FIG. 2.

First, in response to an instruction stored in the ROM 3, the CPU 2 sets, in the DMA circuit 8, a start address of the RAM 4 for storing received data and the number of bytes received from outside of the chip 1 (step r1 in FIG. 4). In the timing chart in FIG. 2, the start address is SA1 and the number of bytes is (n) (e.g., wherein "n" is an integer).

Once the CPU 2 enables the serial communication circuit 9 to allow reception, the circuit 9 initiates reception when the serial input a1 is input from the terminal 21 (step r2 in FIG. 4).

When the serial reception has been finished, the serial communication circuit 9 outputs the reception completion signal a3 to the DMA circuit 8 (step r3 in FIG. 4).

In response to the signal a3, the DMA circuit 8 outputs the DMA request signal a5 to the bus control circuit 7. The bus control circuit 7 arbitrates the bus cycle of the internal bus 11, and upon accepting a DMA bus cycle (step r4 in FIG. 4), outputs the DMA acknowledge signal a6 to the DMA circuit 8 and the CPU clock stop signal a10 to the CPU 2 and the CPU clock control circuit 5.

The CPU clock control circuit 5 uses the CPU clock stop signal a10 to stop the CPU clock a7 supplied to the CPU 2, for four clocks, for example. The CPU 2 stops the internal bus 11 while the CPU clock stop signal a10 has an active level (e.g., "1"), whereas it stops the RAM data bus 17 while the DMA acknowledge a6 has an active level (e.g., "1"), such that in each case, the bus 11 is opened (released) (step r5 in FIG. 4).

During the time period in which the internal bus 11 or the RAM data bus 17 is released (e.g., opened) (see T1 to T4 in FIG. 3), the DMA circuit 8 uses the bus 11 to transfer data from the RAM 4 to the serial communication circuit 9. During T1 and T2, the DMA circuit 8 outputs, to the internal bus 11, the address SA1 of the RAM 4 set beforehand by the CPU (step r6 in FIG. 4). The multiplexer 15 buffers the address SA1 on the bus 11, and outputs it to the RAM address 16 for four clocks from the middle of T1.

The DMA circuit 8 outputs the DMA data strobe signal a4 to the serial communication circuit 9 during the periods T3 and T4. The serial communication circuit 9 outputs received data SD1 to the internal bus 11 during these periods (step r7 in FIG. 4).

The RAM data buffer 18 obtains the received data SD1 from the internal bus 11, and outputs it to the RAM data bus 17, thereby to write the received data SD1 to the address SA1 of the RAM 4 (step r8 in FIG. 4).

To provide for a subsequent DMA transfer (e.g., receiving data for the DMA mode), the DMA circuit 8 decrements the address of the RAM by one and also decrements a counter (not illustrated), indicating the number of transfers, by one.

Thus, a single DMA transfer has been finished. The bus control circuit 7 raises the CPU clock stop signal a10 to an inactive level (e.g., "0"), and the CPU clock control circuit 5 resumes the supply of clock signals to the CPU 2 (step r9 in FIG. 4).

If a specified number of DMA transfers have not been finished (as judged by the DMA circuit based on a value of the counter mentioned above), the serial communication circuit 9 waits for a serial input a1 from the terminal 21, and if one has arrived, starts serial data reception. Subsequently, steps r2 to r10 in FIG. 4 are repeated.

Figure 3:
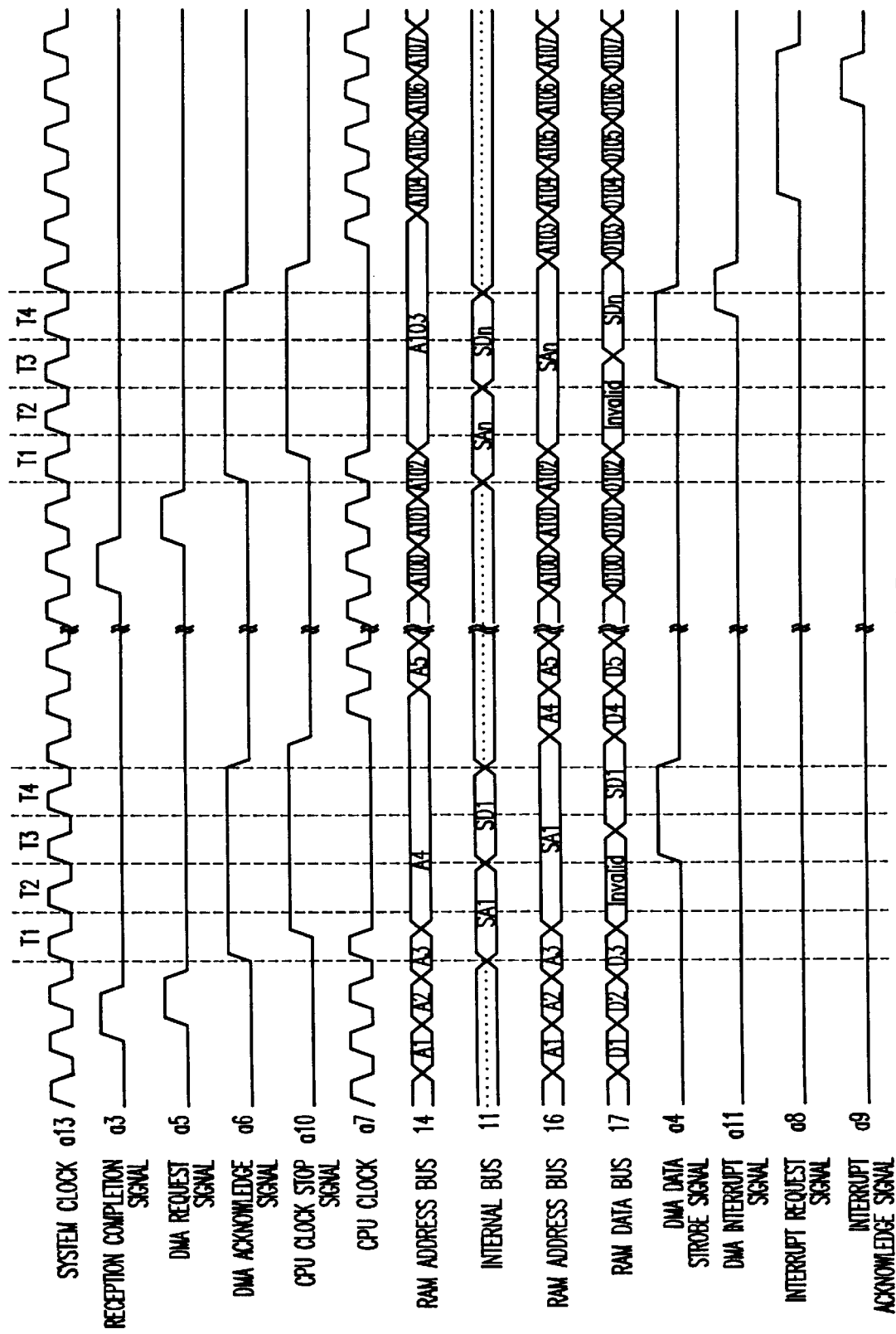

Once a specified number of DMA transfers have been finished (e.g., (n) times in FIG. 3), the DMA circuit 8 outputs the reception completion interrupt signal a11 to the interrupt control circuit 6 (step r11 in FIG. 4).

The interrupt control circuit 6 outputs the interrupt request signal a8 to the CPU 2. Upon receiving the interrupt request signal a8, the CPU 2 outputs the interrupt acknowledge signal a9 to the interrupt control circuit 6 (step r12 in FIG. 4).

Next, a transmission operation (e.g., outputting data) is described with reference to the timing chart in FIG. 5 and the flowchart in FIG. 6.

Figure 5:
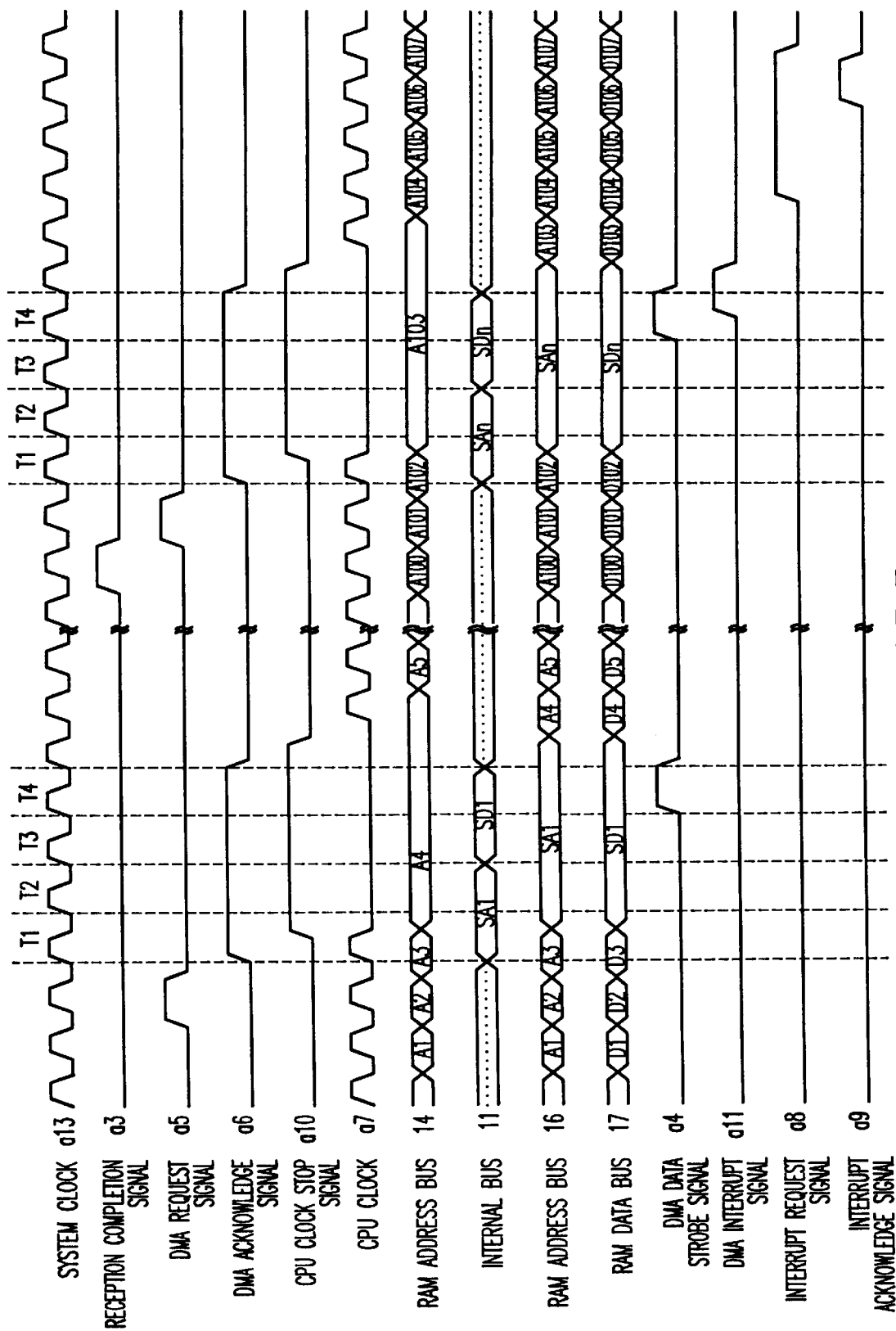
FIG. 5 is a timing-chart for explaining the operation for outputting serial data of the system shown in FIG. 2.
Figure 6:
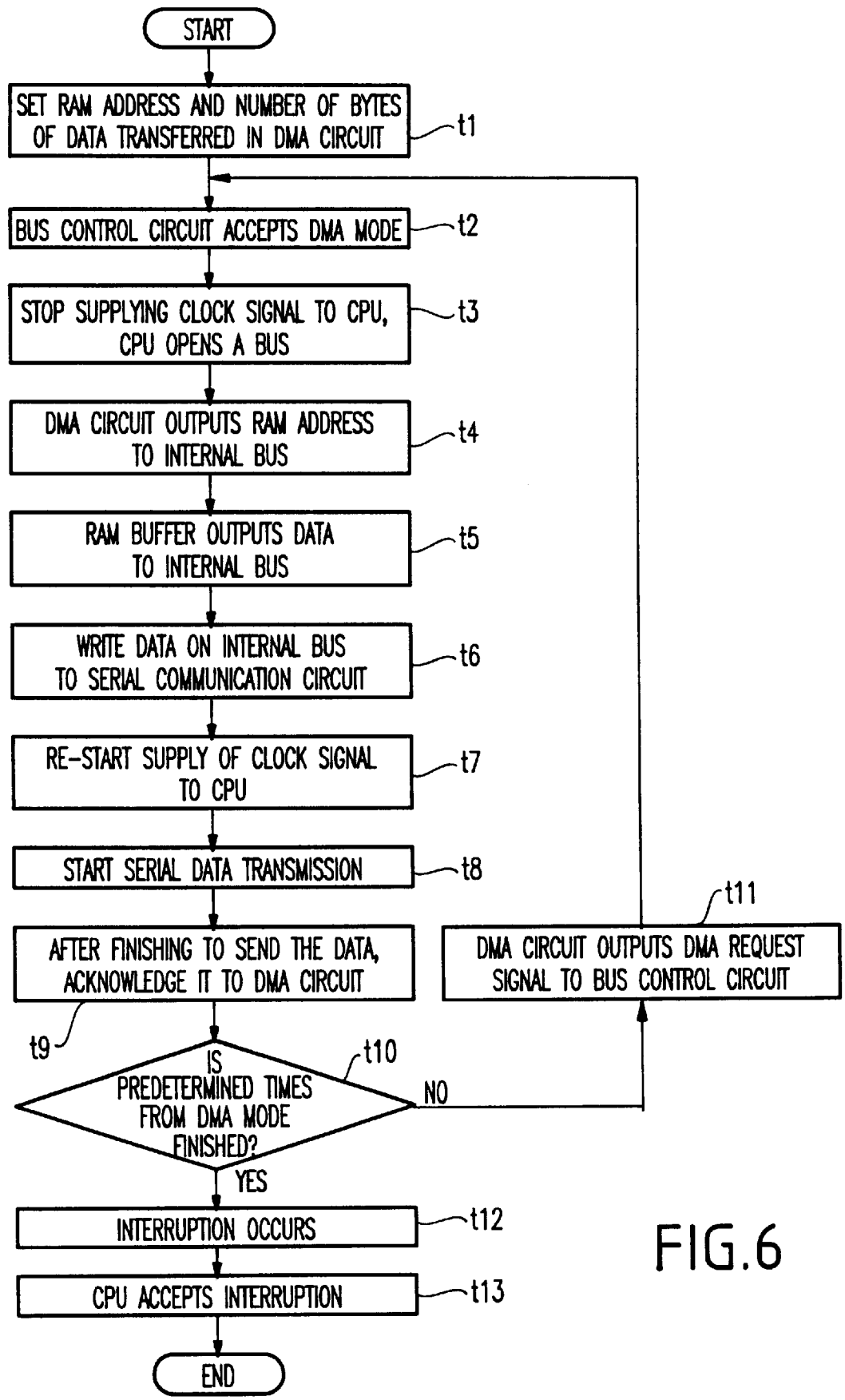
FIG. 6 is a flowchart for explaining the operation for outputting serial data of the system shown in FIG. 2.

First, in response to an instruction stored in the ROM 3, the CPU 2 sets, in the DMA circuit 8, the start address for outputting data from the RAM 4 and the number of bytes (t1 in FIG. 6). In the timing chart in FIG. 5, the start address is SA1 and the number of bytes transferred is (n).

Once the setting by the CPU 2 has been finished, the DMA circuit 8 outputs the DMA request signal a5 to the bus control circuit 7. The bus control circuit 7 arbitrates the bus cycle of the internal bus 11, and upon accepting a DMA bus cycle (t2 in FIG. 6), outputs the DMA acknowledge signal a6 to the DMA circuit and the CPU clock stop signal a10 to the CPU 2 and the CPU clock control circuit 5.

The CPU clock control circuit 5 uses the CPU clock stop signal a10 to stop the CPU clock a7 supplied to the CPU 2, for four clocks. The CPU 2 stops the internal bus 11 while the CPU clock stop signal a10 has an active level (e.g., "1"), whereas it stops the RAM data bus 17 while the DMA acknowledge signal a6 has an active level (e.g., "1"), such that in each case, the bus is released (step t3 in FIG. 6).

During the time period in which the internal bus 11 or the RAM data bus 17 is released (e.g., opened) (see T1 to T4 in FIG. 5), the DMA circuit 8 uses the bus 11 to transfer data from the RAM 4 to the serial communication circuit 9. During T1 and T2, the DMA circuit 8 outputs, to the internal bus 11, the address SA1 of the RAM 4 set beforehand by the CPU (step t4 in FIG. 6). The multiplexer 15 buffers the address SA1 on the bus 11 and outputs it to the RAM address 16 for four clocks beginning at the middle of T1.

The RAM 4 outputs the data SD1 at the address SA1 of the RAM 4 to the data bus 17. The data buffer 18 outputs the data SD1 on the RAM data bus 17 to the internal bus 11 during the periods T3 and T4 (step t5 in FIG. 6).

The DMA circuit 8 outputs the DMA data strobe signal a4 to the serial communication circuit 9 during the period T4. To provide for subsequent DMA transfer, the DMA circuit 8 decrements the address of the RAM by one and also decrements the counter, indicating the number of transfers, by one.

The serial communication circuit 9 uses the DMA data strobe signal a4 to obtain the data SD1 from the internal bus 11 (step t6 in FIG. 6).

Thus, a single DMA transfer has been finished. The bus control circuit 7 drops the CPU clock stop signal a10 to an inactive level (e.g., "0"), and the CPU clock control circuit 5 resumes the supply of clock signals to the CPU 2 (step t7 in FIG. 6).

The serial communication circuit 9 outputs the data to the terminal 20 as the serial output a2. Once the serial output has been finished, the serial communication circuit 9 outputs the transmission completion signal a3 to the DMA circuit 8 (step t9 in FIG. 6).

If a specified number of DMA transfers have not been finished (as judged by the DMA circuit by using a value of the counter mentioned above), the DMA circuit 8 outputs the DMA request signal a5 to the bus control circuit 7 (step t11 in FIG. 6). Subsequently, steps t2 to t10 in FIG. 6 are repeated.

Once a specified number of DMA transfers have been finished ((n) times in FIG. 5), the DMA circuit 8 outputs the transmission completion interrupt signal a11 to the interrupt control 6 (step t12 in FIG. 6). The interrupt control circuit 6 outputs the interrupt request a8 to the CPU 2. Upon receiving the interrupt, the CPU 2 outputs the interrupt acknowledge signal a9 to the interrupt control circuit 6 (step t13 in FIG. 6).

As mentioned above, the CPU 2 is connected to the RAM 4 by using the RAM bus 17, and is disconnected from the internal bus 11, when it is not in the DMA mode. Therefore, the CPU 2 can access the RAM 4 faster than in the conventional system, because the length of the bus connecting the CPU 2 and the RAM 4 is substantially shorter than in the conventional system.

Additionally, after the DMA mode is finished, the CPU 2 can operate instructions faster than in the conventional system, because the CPU clock control circuit 5 always receives the system clock a12, then immediately begins outputting the clock signals for the CPU 2. As mentioned above, the system clock a12 is always supplied to the circuits in the chip 1, and is never stopped, because the quartz oscillator 19 continues to operate even during the DMA mode.

Figure 7:
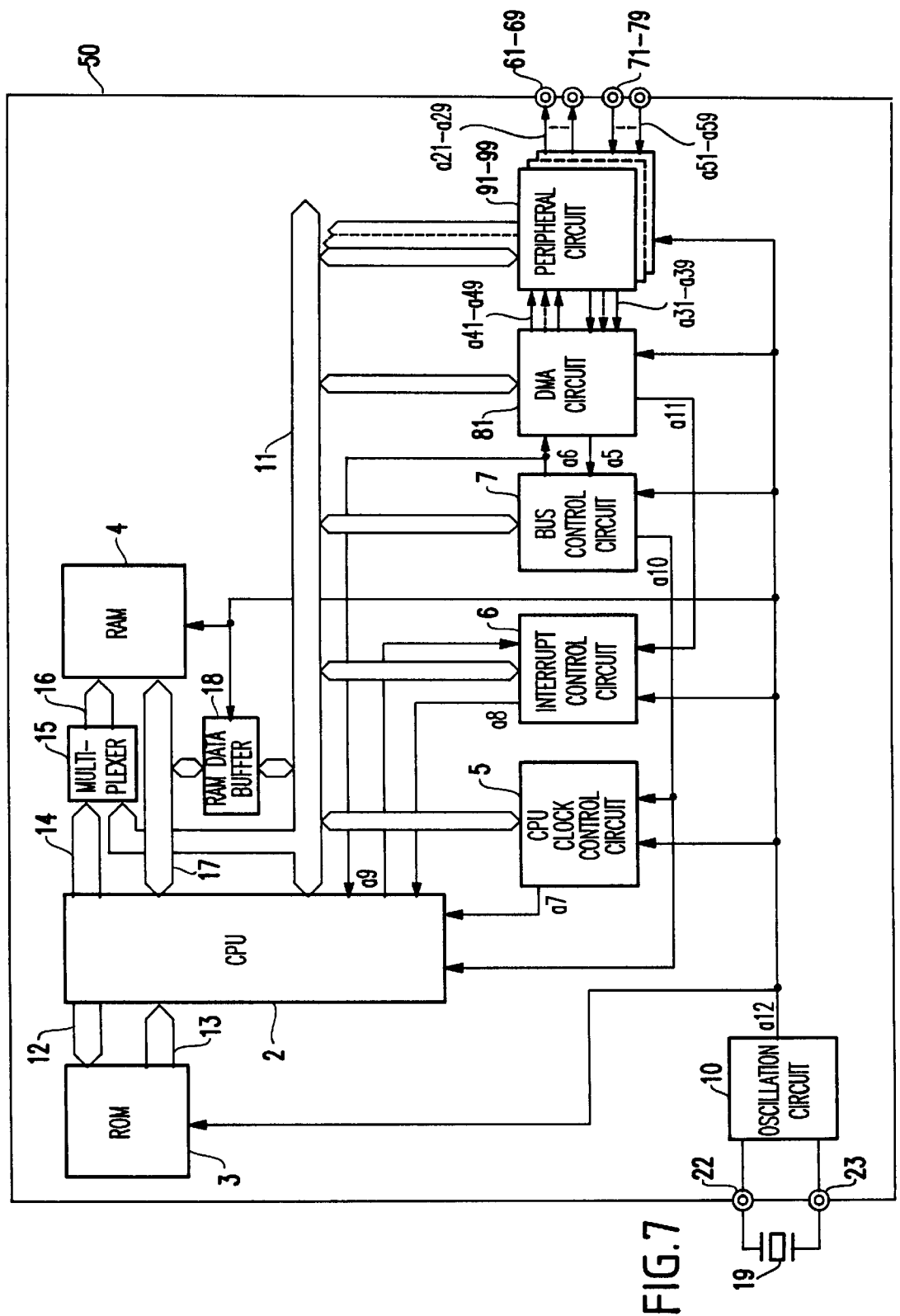
FIG. 7 illustrates a computer system having a DMA mode according to a second embodiment of the present invention.

FIG. 7 is a block diagram showing a second embodiment of the present invention. A single-chip computer system 50 of the second embodiment includes a plurality of peripheral circuits 91–99 (e.g., parallel communication circuits, A/D converters, D/A converter, etc.) and a DMA circuit 81 corresponding to the plurality of peripheral circuits 91 to 99. The same parts in FIG. 7 as those in FIG. 2 are numbered with the same reference numerals in FIG. 2, and for brevity, explanations of these parts are omitted from the following description.

The peripheral circuits 91 to 99 output corresponding DMA request signals a31 to a39, respectively, to the DMA circuit 81, and receive corresponding DMA strobe signals a41 to a49 from the DMA circuit 8. Additionally, these circuits output corresponding signals (e.g., data) a21 to a29 to terminals 61 to 69, respectively, and receive corresponding signals a51 to a59 from terminals 71 to 79, respectively.

The CPU 2 sets, in the DMA circuit 81, the start address of the RAM 4 and the number of bytes for each of the peripheral circuits 91 to 99. The DMA circuit 81 arbitrates the DMA request signals a31–a39 from the plurality of peripheral circuits 91 to 99, and accepts one DMA request signal among the signals a31–a39. Arbitration is performed in a well-known manner, and thus will not be further explained herein. The DMA requests that have not been accepted are reserved, and are subjected to the next arbitration. The DMA circuit 81 executes a DMA transfer between the accepted peripheral circuit and the RAM 4 similarly to the first embodiment.

For example, when the peripheral circuit 95 has been accepted, the DMA circuit 81 outputs the DMA request signal a5 to the bus control circuit 7. When the bus control circuit 7 outputs the DMA acknowledge signal a6, the DMA circuit 81 outputs an address for the peripheral circuit 95 onto the internal bus 11. In the DMA transfer from the peripheral circuit 95 to the RAM 4, the DMA circuit 81 outputs the DMA data strobe signal a45 to the peripheral circuit 95, and the peripheral circuit 95 outputs data onto the bus 11.

The RAM data buffer 18 outputs the data on the bus 11 to RAM data bus 17, and the data is written to the RAM 4. Conversely, in the DMA transfer from the RAM 4 to the peripheral circuit 95, the RAM data buffer 18 outputs the data on the RAM data bus 17 onto the bus 11.

The DMA circuit 81 outputs the DMA data strobe signal a45 to the peripheral circuit 95, and the data on the bus 11 is written to the peripheral circuit 95.

Once a single DMA transfer has been finished, the DMA circuit 81 arbitrates the outstanding DMA requests and selects one of them. Subsequently, DMA transfer and arbitration are repeated to execute DMA transfers for all the DMA requests. Arbitration is performed in a well-known manner, and thus, for brevity, will not be explained in detail herein.

As mentioned above, the second embodiment has the same advantages as the first embodiment, and also the second embodiment is more preferable because it includes a plurality of circuits for different purposes.

As mentioned above, the single-chip computer system of this invention performs a single DMA transfer within, for example, 4 clocks between each peripheral circuit and the RAM, the RAM 4 being accessed within one clock from the CPU. Additionally, during DMA transfer, the CPU clock can be stopped to reduce the power consumed by the CPU.

While the invention has been described in terms of several preferred embodiments, those skilled in the art will recognize that the invention can be practiced with modification within the spirit and scope of the appended claims.

Having thus described my invention, what I claim as new and desire to secure by Letters Patent is as follows:

1. A computer system having a direct memory access (DMA) mode, comprising:
   a central processing unit (CPU) for executing instructions;
   a first bus connected to said CPU;
   a memory array, connected to said first bus, for storing data;
   a buffer connected to said first bus;
   a second bus connected to said buffer;
   a communication circuit, connected to said second bus, for receiving and outputting data; and
   a clock control circuit for generating a first clock signal when said DMA mode is not executed, and for stopping generation of said first clock signal when the DMA mode is executed,
   wherein said buffer connects said first bus to said second bus when said DMA is executed, and disconnects said first bus from said second bus when said DMA is not executed.

2. The system as recited in claim 1, further comprising:
   a first address bus connected to said CPU;
   a multiplexer connected to said first address bus and said second bus; and
   a second address bus connected to said multiplexer and said memory array, wherein said multiplexer connects said first address bus to said second address bus when said DMA mode is not executed, and connects said second bus to said second address bus when said DMA mode is executed.

3. The system as recited in claim 2, further comprising:
   said clock control circuit for supplying said first clock signal to said CPU; and
   an oscillation circuit for supplying a second clock signal to said clock control circuit,
   wherein said clock control circuit generates said first clock signal based on said second clock signal, outputs said first clock signal to said CPU when said DMA mode is not executed, and stops supplying said first clock signal to said CPU when said DMA mode is executed.

4. The system as recited in claim 3, wherein said oscillation circuit continues supplying said second clock signal to said clock control circuit regardless of said DMA mode being executed.

5. The system as recited in claim 4, wherein said oscillation circuit comprises a quartz oscillator.

6. The system as recited in claim 5, wherein said system is formed on a single semiconductor chip.

7. The system as recited in claim 1, wherein said system is formed on a single semiconductor chip.

8. The system according to claim 1, wherein said first bus has a length shorter than that of said second bus.

9. The system according to claim 1, wherein said first bus comprises a data bus dedicated for use between said CPU and said memory array.

10. The system according to claim 1, wherein said second clock signal comprises a clock signal having a stable oscillating frequency which is continually produced.

11. The system according to claim 1, wherein said first bus is directly connected to said CPU, and said memory array is directly connected to said CPU through said first bus, and wherein said second bus is connectable to said memory array through said first bus.

12. A computer system having a direct memory access (DMA) mode, comprising:
    a central processing unit (CPU) for executing instructions;
    a clock control circuit for supplying a first clock signal to said CPU; and
    an oscillation circuit for supplying a second clock signal to said clock control circuit,
    wherein said clock control circuit generates said first clock signal based on said second clock signal, outputs said first clock signal to said CPU when said DMA mode is not executed, and stops supplying said first clock signal to said CPU when said DMA mode is executed.

13. The system as recited in claim 12, further comprising:
    a first bus connected to said CPU;
    a memory array, connected to said first bus, for storing data;
    a buffer connected to said first bus;
    a second bus connected to said buffer; and
    a communication circuit, connected to said second bus, for receiving data and outputting data,
    wherein said buffer connects said first bus to said second bus when said DMA mode is executed, and disconnects said first bus to said second bus when said DMA mode is not executed.

14. The system as recited in claim 13, further comprising:
    a first address bus connected to said CPU;
    a multiplexer connected to said first address bus and said second bus; and
    a second address bus connected to said multiplexer and said memory array,
    wherein said multiplexer connects said first address bus to said second address bus when said DMA mode is not executed, and connects said second bus to said second address bus when said DMA mode is executed.

15. The system as recited in claim 14, wherein said oscillation circuit continues supplying said second clock signal to said clock control circuit regardless of said DMA mode being executed.

16. The system as recited in claim 15, wherein said oscillation circuit comprises a quartz oscillator.

17. The system as recited in claim 16, wherein said system is formed on a single semiconductor chip.

18. The system as recited in claim 12, wherein said system is formed on a single semiconductor chip.

19. The system according to claim 8, further comprising:

a first bus directly connected to said CPU; and a memory array, directly connected to said CPU through said first bus, for storing data; and a second bus for being coupled to said memory array through said first bus, wherein said first bus is coupled to said second bus when said DMA is executed, and said first bus is disconnected from said second bus when said DMA is not executed.

20. The system according to claim 19, wherein said first bus comprises a data bus dedicated for use between said CPU and said memory array.

21. The system according to claim 19, wherein said first bus has a length shorter than that of said second bus.

22. A clock control circuit for a direct memory access (DMA) mode in a computer system, comprising:

means for generating a first clock signal when said DMA mode is not executed;

means for stopping generating said first clock signal when said DMA mode is executed; and an oscillation circuit, coupled to said clock control circuit for supplying a second clock signal, wherein said clock control circuit generates said first clock signal based on said second clock signal, and said oscillation circuit continues outputting said second clock signal regardless of said DMA mode being executed, and wherein said second clock signal is for clocking the computer system when said DMA mode is not executed, and said first clock signal is used to clock the system when said DMA mode is being executed.

23. The circuit as recited in claim 15, wherein said oscillation circuit comprises a quartz oscillator.

24. A method for operating a computer system having a direct memory access (DMA) mode, comprising:

generating a first clock signal;

generating a second clock signal based on said first clock signal;

outputting said second clock signal to a central processing unit (CPU) when said DMA mode is not executed; and stopping supplying said second clock signal to said CPU when said DMA mode is executed, wherein said second clock signal is for clocking the computer system when said DMA mode is not executed and said first clock signal is for clocking the system in said DMA mode.

25. The method according to claim 24, further comprising:

connecting a first bus directly to said CPU;

connecting a memory array directly to said CPU through said first bus, said memory array for storing data; and a second bus for being connected to said memory array through said first bus, wherein said first bus is connected to said second bus when said DMA is executed, and said first bus is disconnected from said second bus when said DMA is not executed.

26. The method according to claim 25, wherein said first bus comprises a data bus dedicated for use between said CPU and said memory array, and wherein said first bus has a length shorter than that of said second bus.

* * * * *